Patented Dec. 19, 1939

2,184,010

UNITED STATES PATENT OFFICE 2,184,010

DENATURED ALCOHOL CONTAINING A LOWER ALKYL AMYL MIXED ETHER

Louis J. Figg, Jr., and James W. Rhea, Kingsport, Tenn., assignors to Eastman Kodak Company, Rochester, N. Y., a corporation of New Jersey No Drawing. Application September 28, 1937, Serial No. 166,123

3 Claims. (Cl. 202—77)

This invention relates to the denaturing of ethyl alcohol, and to alcohol so denatured.

It is an object of our invention to provide a denaturant which will render ethyl alcohol containing it unfit for use as a beverage, which cannot be economically removed from the alcohol by any known methods, which will not render the alcohol unfit for industrial uses in which denatured alcohol has customarily been employed, and which will be free from methanol. Other objects will hereinafter appear.

We have discovered that a lower alkyl amyl mixed ether selected from the group consisting of the methyl amyl ethers and the ethyl amyl ethers is an effective denaturant for alcohol. For example, we may employ methyl n-amyl ether, methyl tertiary-amyl ether, ethyl n-amyl ether, ethyl isoamyl ether, or ethyl tertiary-amyl ether. In denaturing ethyl alcohol with our novel denaturants, we may use from 0.5 to 5 parts of the mixed ether, or even more, per 100 parts of 95% alcohol. These lower alkyl amyl mixed ethers may be used alone in denaturing, or they may be used in conjunction with denaturing materials derived from the destructive distillation of hardwood, such as those which are described in United States Patents 1,975,090; 1,975,091, and 1,975,092. When used in conjunction with these hardwood denaturants, they decrease the coloration of the alcohol brought about by the hardwood denaturants. The decoloration takes place on standing for several days.

Likewise, our novel ether denaturants may be used in conjunction with aliphatic ketones, or with a lower alkyl acetal, such as acetal or dimethyl acetal, or with amino compounds, or with any other denaturants with which they may be found to be compatible. For instance, we may use the following combinations of denaturants:

Example I:                              Per cent by volume
Methyl ethyl ketone_____ 20
Methyl amyl ether_____ 40
Methyl isobutyl ketone_____ 40

Example II:
Methyl ethyl ketone_____ 20
Methyl amyl ether_____ 40
Di-butyl ether_____ 40

Example III:
Light acid and washed alcohol oils_____ 4.00
Allyl alcohol_____ 3.00
Isopropyl alcohol_____ 4.25
Water_____ 1.50
Methyl ethyl ketone_____ 20.00
Methyl amyl ether_____ 33.62
Methyl isobutyl ketone_____ 33.63

The light acid oil and washed alcohol oil referred to in Example III are described in United States Patent 1,975,091, of Louis J. Figg, Jr.

From 0.5 to 5 parts, or even more, of any of the combinations mentioned above, may be used per 100 parts of 95% alcohol. When our lower alkyl amyl mixed ethers are used in combination with acetal or dimethyl acetal, not more than 1 part of the denaturant combination per 100 parts of 95% alcohol is necessary, although more may be used if desired.

When our novel ethers are used in conjunction with ketones, azeotropes are formed with alcohol and water which distil over in all fractions throughout the entire boiling range of the denatured alcohol.

What we claim as our invention and desire to be secured by Letters Patent of the United States is:

1. Denatured ethyl alcohol containing, as an essential denaturing element, from 0.5 to 5 parts, approximately, of a lower alkyl amyl mixed ether selected from the group consisting of the methyl amyl ethers and the ethyl amyl ethers, per 100 parts of 95% alcohol.

2. Denatured ethyl alcohol containing, as an essential denaturing element, from 0.5 to 5 parts, approximately, of a methyl amyl ether per 100 parts of 95% alcohol.

3. Denatured ethyl alcohol containing, as an essential denaturing element, from 0.5 to 5 parts, approximately, of an ethyl amyl ether per 100 parts of 95% alcohol.

LOUIS J. FIGG, JR.
JAMES W. RHEA.